US012724773B2

(12) United States Patent
Li et al.

(10) Patent No.: US 12,724,773 B2
(45) Date of Patent: Sep. 1, 2026

(54) COMPUTING SYSTEM THAT IS CONFIGURED TO IDENTIFY SEARCH RESULTS BASED UPON MULTI-MODALITY SEARCHES

(71) Applicant: Microsoft Technology Licensing, LLC, Redmond, WA (US)

(72) Inventors: Yinheng Li, Redmond, WA (US); Justin James Wagle, Pacifica, CA (US); Kazuhito Koishida, Shoreline, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/671,909

(22) Filed: May 22, 2024

(65) Prior Publication Data

US 2025/0363109 A1 Nov. 27, 2025

(51) Int. Cl.
*G06F 16/2453* (2019.01)

(52) U.S. Cl.
CPC .............................. *G06F 16/24542* (2019.01)

(58) Field of Classification Search
None
See application file for complete search history.

(56) References Cited

U.S. PATENT DOCUMENTS

2018/0052929 A1* 2/2018 Liu .................... G06F 16/3347
2021/0224286 A1* 7/2021 Wu .................. G06F 16/24578
2021/0326367 A1* 10/2021 Zeiler .................. G06F 16/335
2022/0164548 A1* 5/2022 Tumuluri .............. G06N 3/084
2022/0230061 A1* 7/2022 Singh ...................... G06F 40/20
2023/0134852 A1* 5/2023 Lee ..................... G06F 16/2455 707/771
2023/0359651 A1* 11/2023 Mei ..................... G06F 16/2455
2024/0013558 A1* 1/2024 Wang .................... G06F 40/279
2025/0086563 A1* 3/2025 Dey ..................... G06Q 10/067
2025/0217428 A1* 7/2025 Pedersen ............. G06F 16/2237

OTHER PUBLICATIONS

Extended European search report received for European Application No. 25175165.7 mailed on Sep. 24, 2025, 10 Pages.
Iren, et al., "A Multimodal Approach for Semantic Patent Image Retrieval", Retrieved from: https://ceur-ws.org/Vol-2909/paper6.pdf, Jul. 15, 2021, pp. 45-49.
Jiang Lu, "Web-scale Multimedia Search for Internet Video Content", International World Wide Web Conferences Steering Committe, Apr. 11, 2016, pp. 311-316.

* cited by examiner

*Primary Examiner* — Richard L Bowen
(74) *Attorney, Agent, or Firm* — Seed Intellectual Property Law Group LLP

(57) ABSTRACT

A computing system that is configured to identify computer-readable items based upon input queries is described. The computing system receives a query and creates a semantic embedding of the query. The computing system searches over multiple indices based upon a keyword in the query and additionally searches over multiple indices based upon the semantic embedding of the query. Search results are identified based upon the multiple searches.

20 Claims, 9 Drawing Sheets

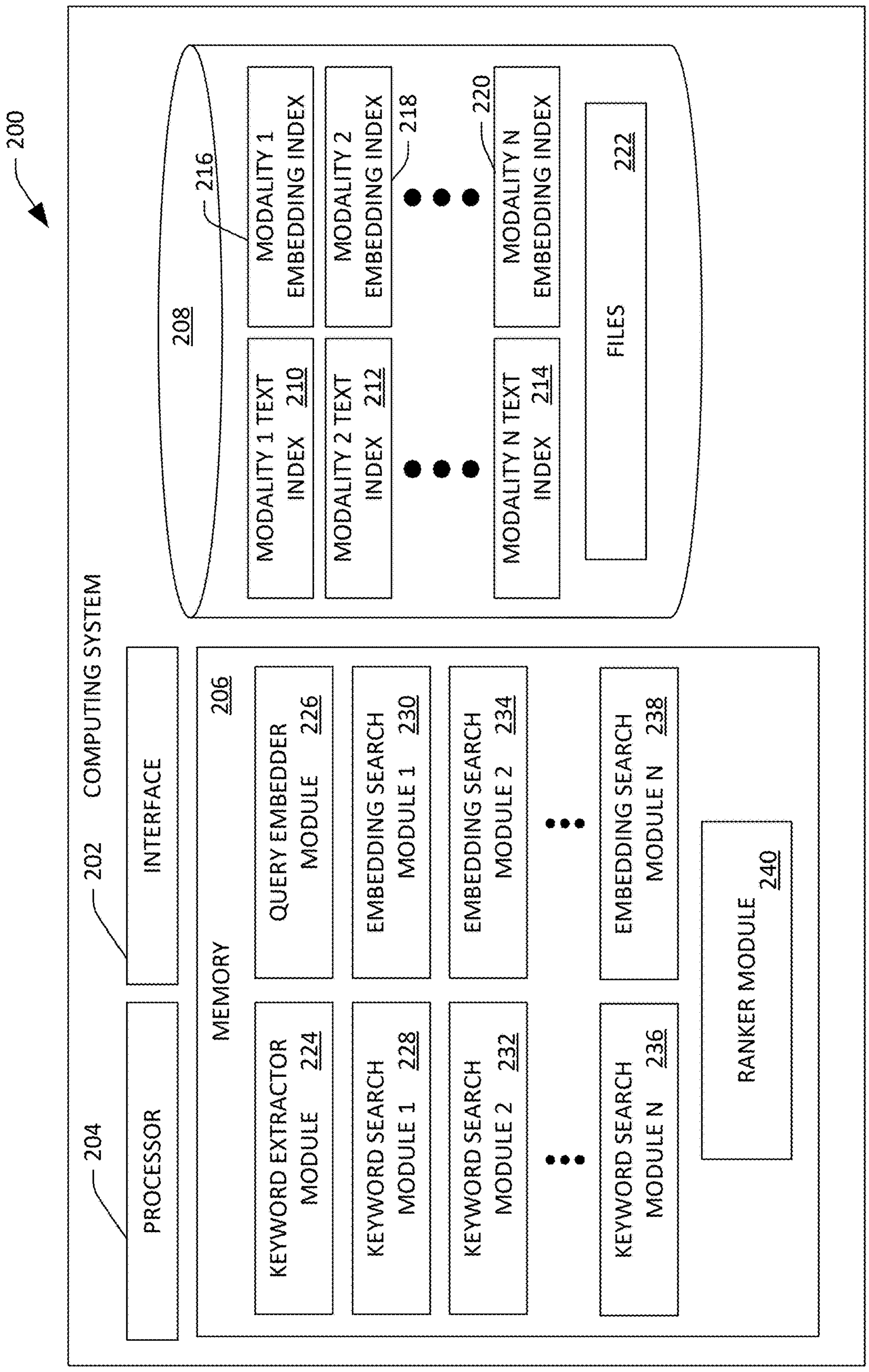

FIG. 2
200
COMPUTING SYSTEM
204
PROCESSOR
202
INTERFACE
MEMORY
206
KEYWORD EXTRACTOR MODULE 224
QUERY EMBEDDER MODULE 226
KEYWORD SEARCH MODULE 1 228
EMBEDDING SEARCH MODULE 1 230
KEYWORD SEARCH MODULE 2 232
EMBEDDING SEARCH MODULE 2 234
KEYWORD SEARCH MODULE N 236
EMBEDDING SEARCH MODULE N 238
RANKER MODULE 240
208
MODALITY 1 TEXT INDEX 210
MODALITY 2 TEXT INDEX 212
MODALITY N TEXT INDEX 214
216
MODALITY 1 EMBEDDING INDEX
218
MODALITY 2 EMBEDDING INDEX
220
MODALITY N EMBEDDING INDEX
FILES 222

COMPUTING SYSTEM THAT IS CONFIGURED TO IDENTIFY SEARCH RESULTS BASED UPON MULTI-MODALITY SEARCHES

BACKGROUND

Conventional computing systems, such as desktop computing devices, server computing systems, laptop computing devices, mobile telephones, and the like, support searching for files based upon received user queries. In an example, a computing system can provide a graphical user interface (GUI) that includes a text entry field, where a user can set forth a query by way of the text entry field. The computing system searches for files stored thereon or accessible thereto based upon the query. Typically, a reverse index is employed to index files by text that is included in or assigned to such files (e.g., in metadata of the files).

Computing systems, however, are currently not configured to accommodate searches for files that include content of different types (e.g., text, images, charts, slides, audio, video, etc.) based upon relatively complex natural language queries, even if the information retrieval intent of the issuer of the query is expressed relatively clearly in the query. For example, a computing system that is configured to support file search functionality is unable to adequately provide search results for the query "help me find a slide deck that I received last month from Tom about pet adoption that includes an image of a cat." When the computing system receives this query, the computing system searches an inverted index for keywords in the query. Therefore, for example, the computing system may return an e-mail that was from "Tom". Such e-mail, however, is not germane to the information retrieval intent of the issuer of the query, as the e-mail is not a slide deck, is not germane to pet adoption, and does not include an image of a cat. Thus, additional computing resources are consumed, as additional, refined queries are received from the issuer of the query, requests from the issuer of the query to sift through search results are received, search results that are not relevant to the information retrieval intent of the issuer of the query are displayed (thereby consuming display real estate), etc.

SUMMARY

The following is a brief summary of subject matter that is described in greater detail herein. This summary is not intended to be limiting as to the scope of the claims.

Described herein are various technologies pertaining to a computer-implemented platform that facilitates search and retrieval of items that include content of different types (where different item types of content correspond to different modalities). In addition, the computer-implemented platform described herein supports searching over multiple modalities based upon relatively complex natural language queries set forth by users.

The computer-implemented platform includes multiple indices for each modality supported by the platform. Example modalities supported by the platform include text, images, charts, video, audio, and so forth. With respect to the text modality, the computer-implemented platform includes a reverse index that indexes text based upon keywords in the text or keywords assigned to the text. In addition, with respect to the text modality, the computer-implemented platform includes an embedding index that indexes text by semantic embeddings of text included in computer-implemented items (e.g., files). The platform includes similar indices for each modality; hence, with respect to the images modality, the platform includes a reverse (keyword) index and an embeddings index.

The computer-implemented platform receives a natural language query set forth by a user. Keywords are extracted from the query through utilization of any suitable keyword extraction technology, such as named entity recognition (NER) technology. In addition, a semantic embedding of the query is generated (e.g., through utilization of any suitable embedding technology, such as Word2vec). Upon the keywords being extracted from the query and the semantic embedding of the query being generated, indices corresponding to the multiple modalities are searched using the extracted keywords and the embedding of the query, respectively (where text indices are searched using the extracted keywords and embedding indices are searched using the embedding of the query).

In an example, the computer-implemented platform supports two modalities: 1) text; and 2) images. As noted above, the computer-implemented platform includes at least two indices for each of the two modalities. With respect to the text modality, the computer-implemented platform searches a first index (a reverse index of keywords in the text) based upon the keywords extracted from the query and searches a second index (an index of embeddings of the text) based upon the embedding of the query. In parallel, and with respect to the second modality, the computer-implemented platform searches a third index (a reverse index for text in images) based upon the keywords extracted from the query and searches a fourth index) an index of embeddings of content of the images) based upon the embedding of the query. Therefore, the computer-implemented platform performs four separate searches over four different indices in response to receipt of a query such that search results corresponding to two different modalities are identified (text and images).

The computer-implemented platform ranks the identified search results based upon scores for the search results with respect to the four separate searches. In an example, a word processing document includes text and an image, and a ranking score for the word processing document is based upon scores for the text and the image for the four different searches. A search result representing the word processing document is positioned in a ranked list of search results based upon the ranking score.

There are various technical advantages of the computer-implemented platform relative to conventional approaches for searching for and identifying items based upon a query. By using a reverse index and an embeddings index for each modality in several modalities, the computer-implemented platform can identify items when relatively complex but well-formed natural language queries are received, such as "help me find the slide I received last month from Tom about pet adoption with an image of a cat." By searching through multiple indices with respect to multiple different modalities, the computer-implemented platform can return a slide show presentation that includes a slide with an image of a cat that was received from "Tom", where the slide includes text pertaining to pet adoption. Moreover, as the searches are performed in parallel, the searches are conducted relatively quickly.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 2 is a functional block diagram of a computing system that facilitates identifying and returning search results based upon a natural language query by searching multiple indices with respect to multiple modalities.

DETAILED DESCRIPTION

Figure 1:
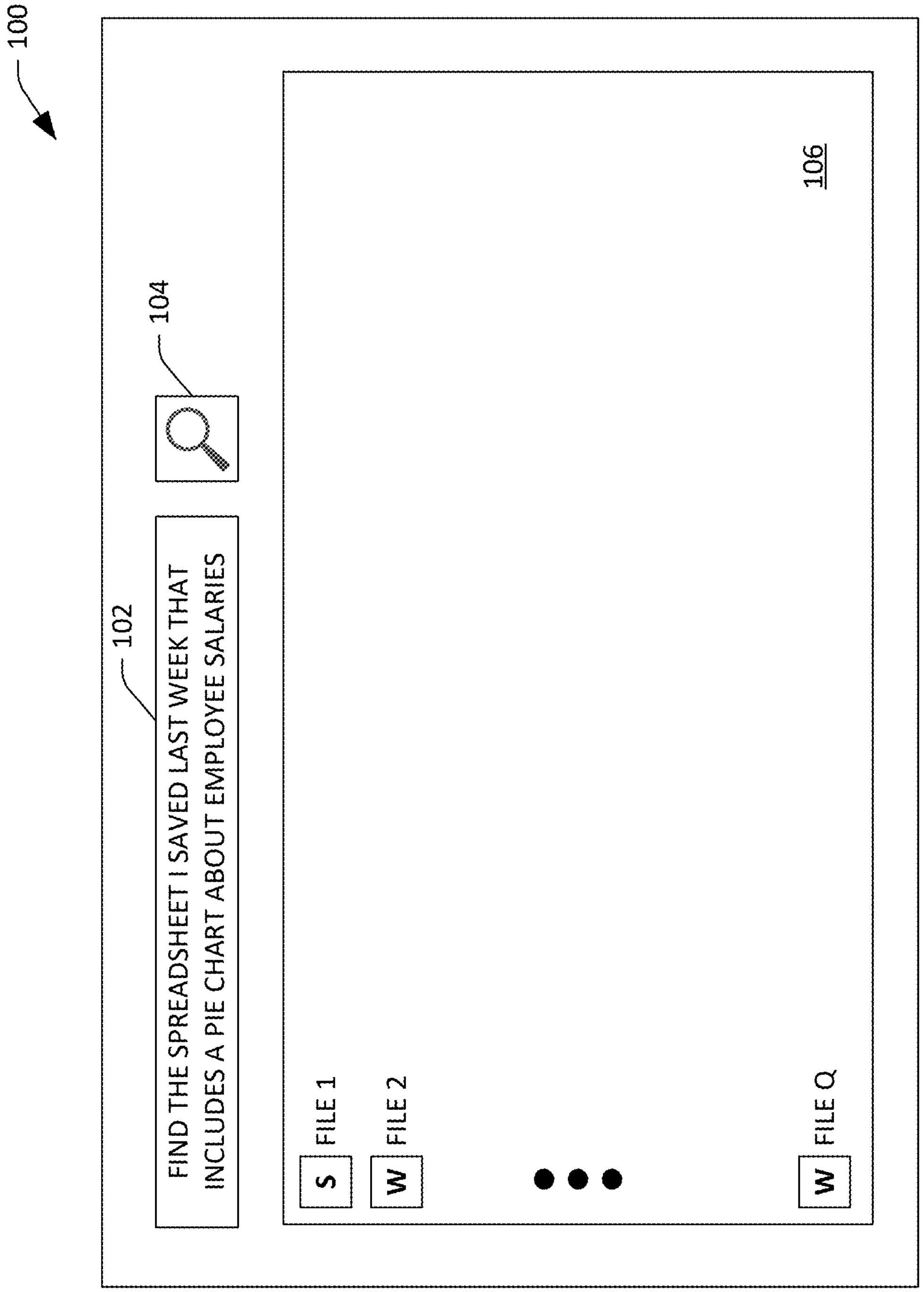
FIG. 1 is a graphical user interface that depicts search results returned to a user upon receipt of a natural language query issued by the user.

Various technologies pertaining to a computer-implemented platform that is configured to identify and return search results based upon a natural language query are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. Thus, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "module," and "system" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices.

Described herein are various technologies pertaining to a computer-implemented platform that is configured to perform file search over user files. In an example, the platform is configured to perform file searches over user files stored on a client computing device of a user. In another example, the platform is configured to perform file searches over user files stored in a hosted online storage system. In contrast to existing systems that perform file searches, the platform identifies files based upon a query by searching over multiple indices for each of several different modalities. In an example, the user can submit the query "where is the slideshow presentation that I downloaded last night about AI strategy with an image of a robot." It is noted that the query references multiple different modalities-"images" and "text"—and thus the user is searching for a file that includes both an image and specific text. Existing semantic text search technologies and image search technologies are unable to search for a file that includes content belonging to multiple different modalities. The computer-implemented platform performs searches over different modalities based upon a user query and ranks files based upon such searches.

With reference to FIG. 1, a graphical user interface (GUI) 100 that illustrates return of search results that correspond to files stored in a computing system is illustrated. The GUI 100 includes a text entry field 102, where the text entry field 102 receives a query set forth by a user of a client computing device that displays the GUI 100. As illustrated in FIG. 1, the text entry field 102 receives the query "find the spreadsheet I saved last week that includes a pie chart about employee salaries." The query is a natural language query and relatively complex. The query references several modalities, including "chart" (pie chart) and "text" (employee salaries). The GUI 100 further includes a search button 104, where a search for user files is initiated in response to the search button 104 being selected by the user of the client computing device. As will be described below, multiple indices for multiple different modalities are searched over based upon the query in connection with identifying search results. The GUI 100 includes a field 106 where identified search results are displayed. The search results are ordered in the field 106 based upon scores computed for the search results, where the scores are indicative of computed relevance of the search results to the query set forth in the text entry field 102. Performing multiple searches over multiple indices corresponding to multiple modalities and ranking search results based upon the multiple searches is described in detail below.

Referring now to FIG. 2, a computing system 200 that is configured to identify files based upon user queries is depicted, where the files are identified based upon multiple searches over multiple indices corresponding to multiple modalities. The computing system 200, in an example, is a client computing device, such as a desktop computing device, a laptop computing device, a tablet computing device, a mobile telephone, a wearable computing device (e.g., an augmented reality and/or virtual reality headset), or the like. In another example, the computing system 200 is a server computing system that hosts an online file storage system that stores user files for users.

The computing system 200 optionally includes an interface 202 that is usable by a user to interact with the computing system 200. For instance, the interface 202 can be or include a keyboard, a microphone (for receiving voice commands), a touch-sensitive display, a mouse, a camera, etc. The computing system 200 further includes a processor 204, memory 206, and a data store 208. The memory 206 includes data that is accessible to the processor 204 and instructions that are executed by the processor 204. The data store 208 includes several indices that correspond to several different modalities. A modality is a type of computer-readable content; example modalities include, but are not limited to, text, image, video, audio, and chart. A single file can include multiple modalities, and a query can refer to multiple modalities. For example, a word processing file can include text, images, and a chart. In another example, a slideshow presentation file can include text, images, video, and charts.

The data store 208 includes at least two indices for each of N modalities. Specifically, the data store 208 includes a text index and an embedding index for each of the N modalities, and therefore includes N text indices 210-214 and N embedding indices 216-220. In an example, the text indices 210-214 are inverted indices that index keywords to computer-readable items (files) that include the keywords. The embedding indices 216-220 include embeddings of content that correspond to the modalities, where the embeddings are mapped to the computer-readable items that include the content. Examples are set forth below in connection with describing the indices 210-220. For instance, the first modality is "text" and the second modality is "images." The modality 1 text index 210 can be an inverted index that indexes keywords of texts extracted from files (e.g., word processing files, spreadsheets, emails, etc.) to the files. Pursuant to an example, a word processing document can include a paragraph that comprises several keywords, and the modality 1 text index 210 can index the keywords to the word processing document. The modality 1 embedding index 216 can include a semantic embedding of the paragraph that is indexed to the word processing document (where any suitable technology can be employed to generate the semantic embedding). The modality 2 text index 212 can include keywords from text extracted from an image (through object character recognition (OCR) technologies) or otherwise assigned to the image (e.g., metadata) that are indexed to the image. The modality 2 embedding index 218 can include semantic embeddings of the text extracted from the image and/or an embedding of the image itself, where such embeddings are indexed to a computer-readable item that includes the image.

The data store 208 further includes files 222 that are pointed to by entries in the indices 210-220. While the files 222 are shown as being in the same data store 208 as the indices 210-220, in other embodiments the files 222 are stored in a separate data store (e.g., on a separate computing device). For instance, the indices 210-220 may be stored on a client computing device while the files 222 are stored in computer-readable storage of a remote server computing system.

The memory 206 includes several modules that are executed by the processor 204. More specifically, the memory 206 includes a keyword extractor module 224 and a query embedder module 226. The keyword extractor module 224 receives a query set forth by a user and extracts keywords from such query. For instance, the keyword extractor module 224 can utilize named entity recognition (NER) technologies to extract keywords from the query. In another example, the keyword extractor module 224 is or includes a transformer encoder model that is used for token classification. The keyword extractor module 224 receives an input query and normalizes the input query, where special characters are removed and characters are placed in lowercase. The keyword extractor module 224 can tokenize the resultant normalized queries and generate output. In an example, when the input query is "find me a document about why AI is the future", the text "why AI is the future" is the expression output by the keywork extractor module 224 (in the form of tokens).

The embedder module 226 receives the query (in parallel with the keyword extractor module 224 receiving the query) and outputs a semantic embedding of the query. In another example, the embedder module 226 receives keywords output by the keyword extractor module 224 and generates a semantic embedding of the extracted keywords. The query embedder module 226 can be or include any suitable text embedding technology, such as Word2Vec, GloVe, or the like.

The memory 206 additionally includes a first keyword search module 228, a first embedding search module 230, a second keyword search module 232, a second embedding search module 234, an Nth keyword search module 236, and an Nth embedding search module 238. The first keyword extractor module 228 and the first embedding search module 230 correspond to the first modality (e.g., text), the second keyword search module 232 and the second embedding search module 234 correspond to the second modality (e.g., images), and the Nth keyword search module 236 and the Nth embedding search module 238 correspond to the Nth modality (e.g., charts). With more specificity, the first keyword search module 228 searches the modality 1 text index 210 based upon the keywords output by the keyword extractor module 224, and the first embedding search module 230 searches the modality 1 embedding index 216 based upon the embedding output by the query embedder module 226. Similarly, the second keyword search module 232 searches the modality 2 text index 212 based upon the keywords output by the keyword extractor module 224, and the second embedding search module 234 searches the modality 2 embedding index 218 based upon the embedding output by the query embedder module 226. Likewise, the Nth keyword search module 236 searches the modality N text index 214 based upon the keywords output by the keyword extractor module 224, and the Nth embedding search module 238 searches the modality N embedding index 220 based upon the embedding output by the query embedder module 226. Hence, a keyword search and a semantic search are conducted for each modality supported by the computing system 200.

The search modules 228-238 output scores for computer-readable items based upon the searches conducted by the search modules 228-238. In an example, the keyword search modules 228, 232, and 236 employ a bag of words retrieval function to assign scores to computer-readable items represented in the indices 210-214. For instance, the keyword search modules 228, 232, and 236 utilize BM25 to assign scores to computer-readable items represented in the indices 210-214. The embedding search modules 230, 234, and 238 can utilize cosine similarity to assign scores to computer-readable items represented in the embedding indices 216-220.

Figure 3:
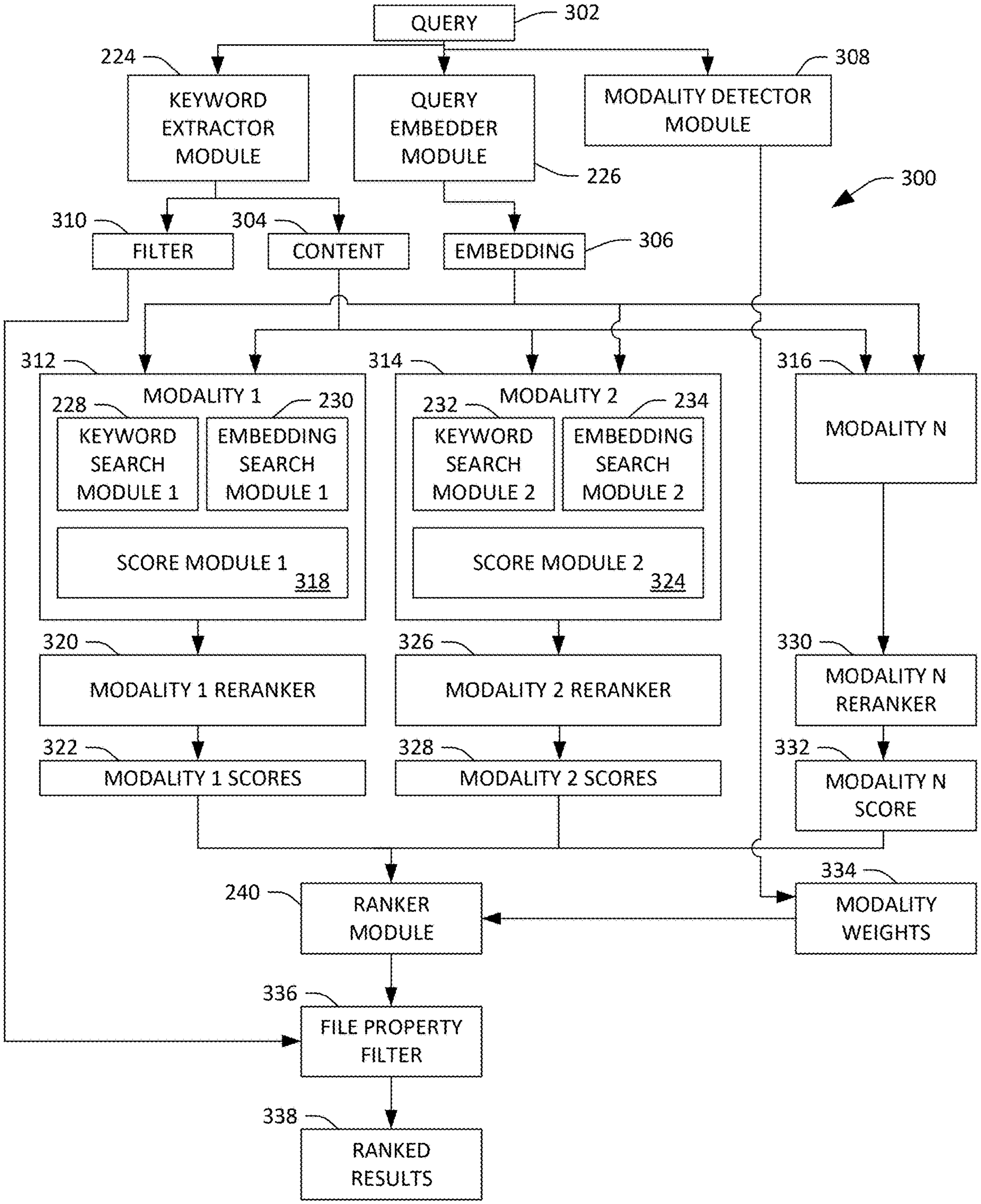
FIG. 3 is a schematic that depicts identification and return of search results in response to receipt of a natural language query.

Referring to FIG. 3, a schematic 300 is shown that illustrates operation of the system 200. The keyword extractor module 224 receives a query 302 set forth by a user. As noted above, the keyword extractor module 224 extracts content 304 (e.g., keywords) from the query 302, as described above. The query embedder module 226 optionally receives the query 302 and outputs a semantic embedding 306 of the query 302. In another example, the query embedder module 226 receives the content 304, and the query embedder module 226 outputs the semantic embedding 306 based upon the content 304. A modality detector module 308 optionally receives the query 302 and, for each modality supported by the computing system 200, outputs a score that is indicative of a likelihood that the query 302 is directed towards the modality. In an example, when the query is "help me find a picture of my cat that I embedded in a document last week", the modality detector module 308 can output a first score for the "image" modality that indicates that there is a relatively high likelihood that the query is directed towards the "image" modality while outputting a second score for the "chart" modality that indicates that there is a relatively low likelihood that the query is directed towards the "chart" modality. As will be described in greater detail below, the scores output by the modality detector module 308 can be utilized in connection with ranking computer-readable items.

A filter 310 optionally receives output of the keyword extractor module 224, where the filter 310 can identify information that is usable to filter computer-readable items returned to a user. In an example, when the query 302 is "find me a document created by Bob that I saved last week", the filter 310 can identify the keyword "document" as identifying a specific type of computer-readable item (e.g., a word processing document), can identify "Bob" as being an author of the document, and can identify "last week" as being a temporal window over which computer-readable items can be filtered.

Searches are then conducted over multiple modalities. A single computer-readable item can include content of several different modalities—for example, a slide presentation can include text, images, videos, charts, etc. The first keyword search module 228 and the first embedding search module 230 correspond to a first modality 312 (e.g., text). The second keyword search module 232 and the second embedding search module 234 correspond to a second modality 314 (e.g., images). While not illustrated in FIG. 3, the Nth keyword search module 236 and the Nth embedding search module 238 correspond to an Nth modality 316 (e.g., charts).

The first keyword search module 228 executes a search over the modality 1 text index 210 and outputs first text scores for computer-readable items based upon the search over the modality 1 text index 210. As indicated previously, the first keyword search module 228 can utilize a bag of words algorithm to compute scores for the computer-readable items based upon whether texts extracted from the computer-readable items include one or more keywords in the content 304. In an example, a score for a computer-readable item output by the first keyword search module 228 can be capped at 50. In parallel, the first embedding search module 230 executes a search over the modality 1 embeddings index 216 and outputs first embeddings scores for the computer-readable items based upon the search over the modality 1 embeddings index 216. In an example, the modality 1 embeddings index 216 includes semantic embeddings of portions of texts extracted from the computer-readable items, where the embeddings are indexed to the computer-readable items that include the portions of the text. The portions of the text can be sentences, paragraphs, a threshold number of tokens (e.g., based upon a maximum sequence length of a model used to generate the embeddings), etc. In a non-limiting example, when generating an embedding for a portion of text, the text can be split into a portion based upon sentence boundaries, where a closest termination symbol (e.g., "/n", ".", "?", "!", ",", ";", ":", etc.) before the maximum length is identified a portion of text that can be embedded. Further, a minimum character length (e.g., 5 characters) can be enforced, where a string of fewer than five characters is ignored and therefore not represented in the modality 1 embedding index. The second scores for the computer-readable items can be cosine similarity scores between the embedding 306 of the query 302 and the embeddings of the portions of text. As a computer-readable item can have multiple portions of text extracted therefrom that are subjected to embedding, the first embedding search module 230 can output multiple scores for the computer-readable item. The first embedding search module 230 can output a highest score for the computer-readable item from amongst the multiple scores for the computer-readable item.

A first score module 318 receives the first text scores output by the first keyword search module 228 and the first embedding scores output by the first embedding search module 230 and outputs first modality scores for the computer-readable items based upon the first scores and the second scores. The first score module 318 can utilize any suitable approach for generating the first modality scores for the computer-readable items. For instance, the score module 318 utilizes a convex combination algorithm to generate the first modality scores.

Optionally, a modality 1 reranker 320 receives the scores for the computer-readable items output by the first score module 318 and reranks the computer-readable items (e.g., assigns updated scores) based upon the scores for the computer-readable items and optionally feature values for the computer-readable items. It has been shown that using a reranking model on top of retrieved candidates may improve recall. The modality 1 reranker 320 can be a transformer encoder, where the query 302 and/or the content 304 is concatenated with each candidate text portion and a matching score is generated for each query-candidate pair. In another example, the modality 1 reranker 320 is or includes a large language model (LLM). In yet another example, the modality 1 reranker 320 uses list reranking to rerank the computer-readable items. Output of the score module 318 or the modality 1 reranker 320 is modality 1 scores 322.

In parallel with the first keyword search module 228 and the first embedding search module 318 executing the searches referenced above, the second keyword search module 232 and the second embedding search module 234 execute searches over the modality 2 text index 212 and the modality 2 embedding index 218, respectively. When the second modality 314 is "images", the modality 2 text index 212 includes text extracted from images and/or text otherwise assigned to the images (e.g., metadata assigned to the images). OCR technologies can be employed to extract text from images. In an example, OCR is not applied to an entirety of an image; rather, a screen region detection model can be employed to identify a text box within the image, and OCR is performed on the detect text boxes. Techniques similar to those described above are then employed to generate the modality 2 text index 212 and the modality 2 embedding index 218. Specifically, the modality 2 text index 212 can be a reverse index that indexes keywords by the computer-readable items that include the images, while the modality 2 embedding index 218 can include embeddings of the text portions extracted from the computer-readable items that point to the computer-readable items. Additionally, embeddings of the images themselves can be generated, such that the embedding 306 of the query output by the query embedder module 226 is in a same latent space as the embeddings in the modality 2 embedding index 218.

The second keyword search module 232 receives the content 304, executes a search over the modality 2 text index 212, and outputs second text scores for computer-readable items based upon such search. In parallel, the second embedding search module 234 receives the embedding 306, executes a search over the modality 2 embeddings index 216 based upon the embedding 306, and outputs second embeddings scores for the computer-readable items based upon the search. When an image does not include text or have text assigned thereto, a text score corresponding to such image can be zero. A computer-readable item can include multiple content for the second modality 314 (e.g., multiple images). A score for the computer-readable item can be a highest score for an image in the computer-readable item from amongst all scores for images in the computer-readable item. A second score module 324 for the second modality 314 receives the scores output by the second keyword search module 232 and the second embedding search module 234 and outputs combined scores (similar to the first score module 318 for the first modality 314). A modality 2 reranker 326 optionally reranks computer-readable items (similar to the modality 1 reranker 320), and final modality 2 scores 328 are generated.

While not illustrated, the Nth modality 316 has modules analogous to those of the modalities 312 and 314, and optionally a modality N reranker 330 reranks computer-readable items to generate modality N scores 332. Searches are conducted and scores are computed across the modalities 312-216 in parallel (i.e., the scores 322, 328, and 332 are not dependent upon one another).

Modality weights 334 are assigned to the different modalities 312-316 based upon output of the modality detector module 308. For example, when the modality detector module 308 outputs scores that indicate that there is a relatively high likelihood that the query 302 pertains to the first modality 312, a weight in the modality weights 334 for the first modality 312 is relatively high. The ranker module 240 receives the modality scores 322, 328, and 332 as well as the modality weights 334 and outputs a final ranking for the computer-readable items. To conserve computing resources, the computer-readable items with the top K modality scores for each modality are provided to the ranker module 240. A computer-readable item may have a high score for one modality and a low score for another modality, such that the score for the computer-readable item for the another modality is outside of the top K scores for the modality. In such a situation, the computer-readable item can be assigned a score of 0 for the modality or can be assigned a same score as the Kth highest score for the modality. The ranker module 240 can utilize any suitable technique when outputting a final ranking of computer-readable items based upon scores for the computer-readable items across the modalities (and optionally the modality weights 334). The ranker module 240 can be or utilize convex combination, a transfer encoder, a LLM, etc. in connection with outputting a final ranking of computer-readable items.

A file property filter 336 receives the ranked computer-readable items output by the ranker module 240 and filters computer-readable items therefrom based upon output of the filter 310. For instance, when output of the filter 310 indicates that the issuer of the query 302 is seeking a word processing document, the file property filter 336 filters computer-readable items included in the output of the ranker module 240 that are not word processing documents. In another example, when output of the filter 310 identifies a time window, the file property filter 336 can filter computer-readable items that do not have timestamps that fall within the time window. Output of the file property filter 336 can include a set of ranked results 338. Optionally, output of the file property filter 336 can be provided to a computer-implemented model that suppresses results when the remaining results are not sufficiently relevant to the query 302.

The computing system 200 exhibits various advantages over conventional information retrieval systems that are employed for file searching. As the computing system 200 supports parallel searches over various modalities, the computing system 200 can identify computer-readable items in response to receipt of relatively complex queries. Moreover, the computing system 200 is customizable to support any suitable number and type of modality, including text, image, chart, video, audio, and so forth.

Figure 4:
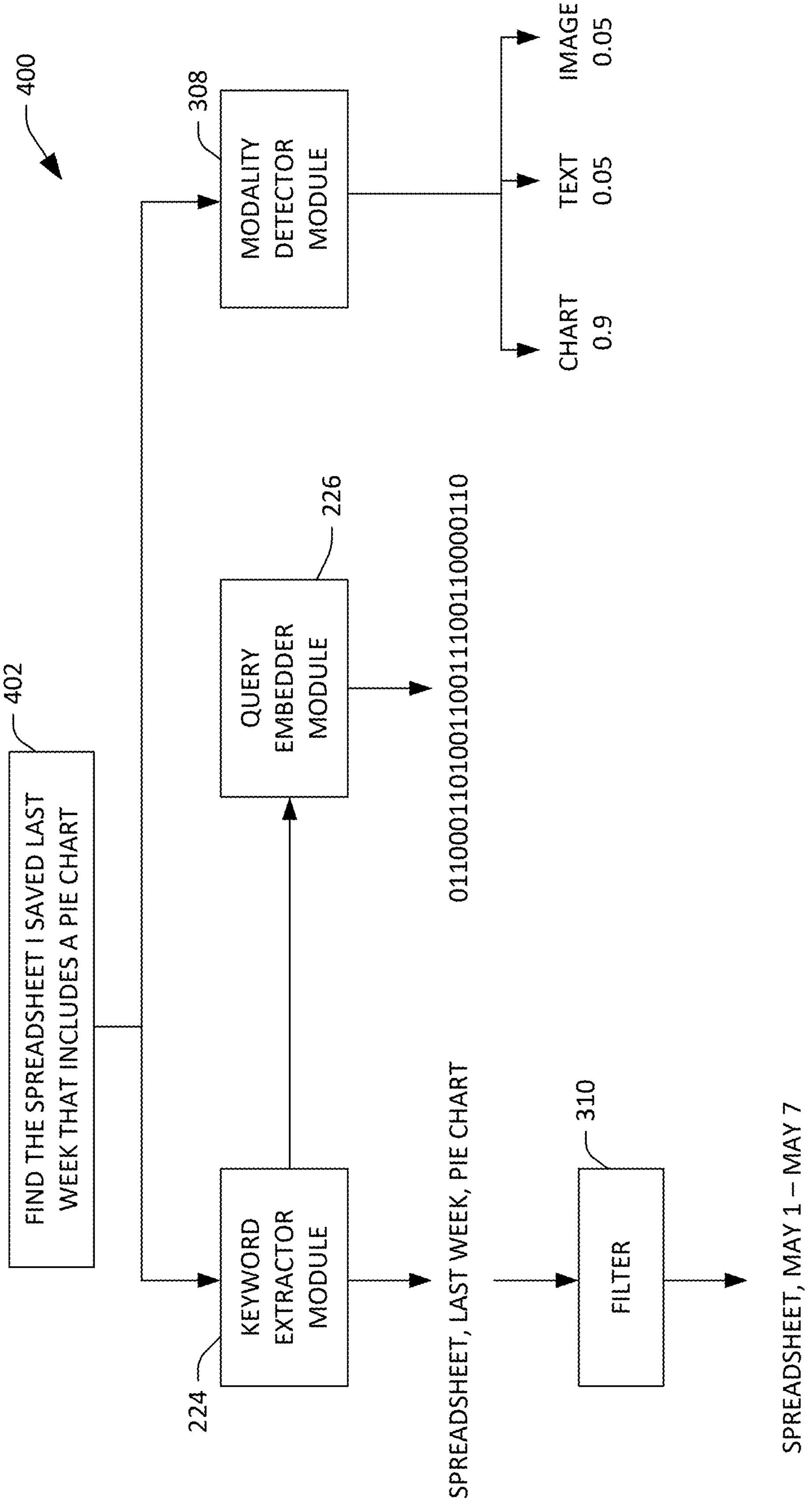
FIG. 4 is a schematic that depicts extraction of keywords from a query, construction of an embedding of the query, and identification of a modality based upon content of the query.

Referring now to FIG. 4, a schematic 400 that depicts an example operation of the keyword extractor module 224, query embedder module 226, modality detector module 308, and filter 310 is presented. The keyword extractor module 224 receives a query 402, where the query is "find the spreadsheet I saved last week that includes a pie chart". The keyword extractor module 224 extracts keywords from the query 402, such as "spreadsheet", "last week", and "pie chart". The filter 310 is provided with the extracted keywords, and outputs filter parameters based upon the extracted parameters. For instance, the filter parameters are to filter by a file type "spreadsheet" and filter between the dates of May 1 and May 7 (e.g., last week).

The query embedder module 226 also receives the keywords extracted from the query 402 by the keyword extractor module 224. The query embedder module 226 generates a vector that is a semantic representation of the extracted keywords.

The modality detector module 308 receives the query 402 and outputs scores for modalities supported by the computing system 200. In the example depicted in FIG. 4, the modality detector module 308 outputs a score of 0.9 for the modality "chart", a score of 0.05 for the modality "text", and a score of 0.05 for the modality "image". These scores are based upon content of the query 402, and the scores indicate that greater weight should be given to scores for computer-readable items with respect to the "chart" modality than scores for computer-readable items with respect to either the "text" or "image" modalities.

Figure 5:
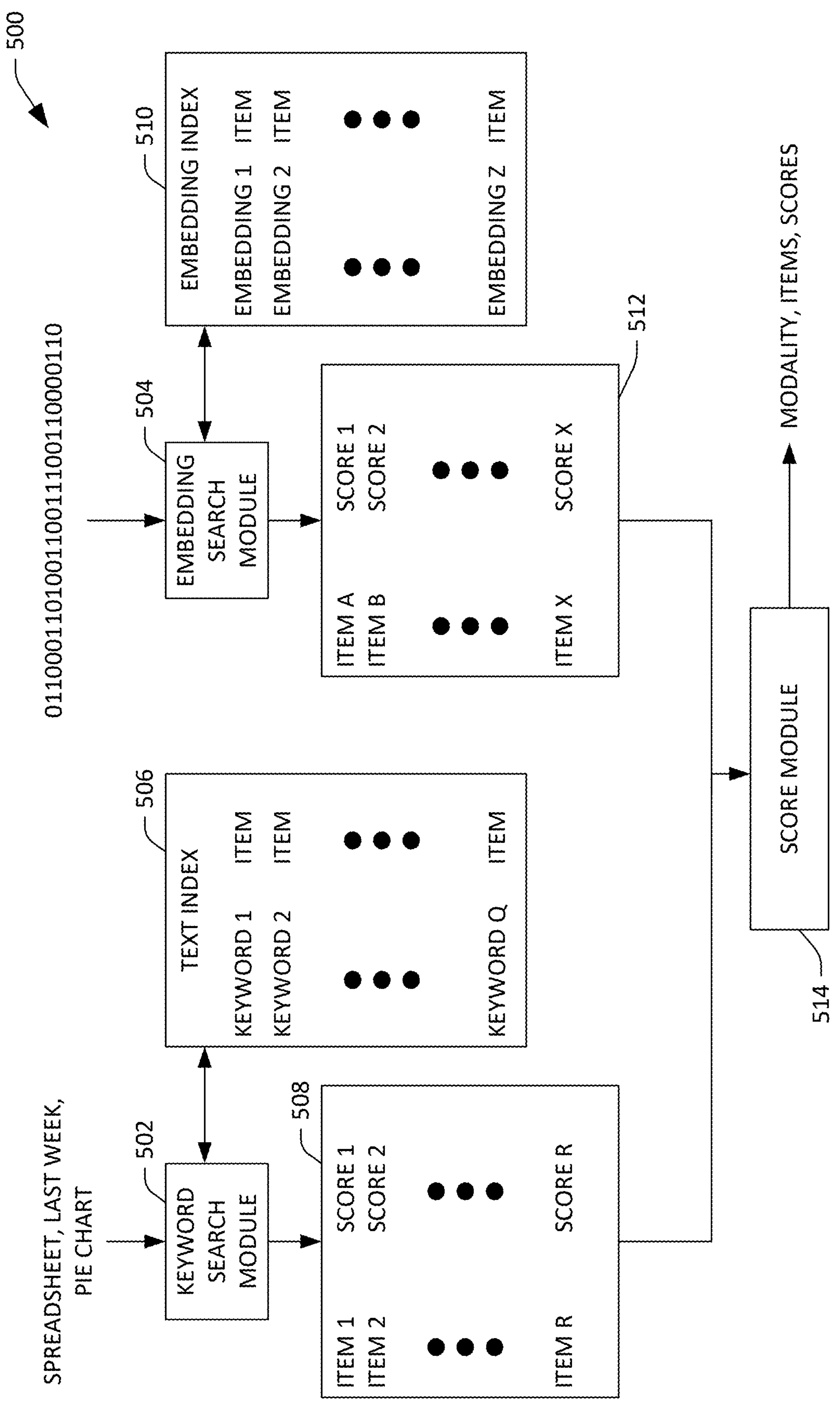
FIG. 5 is a schematic that depicts conducting multiple searches over different indices with respect to a modality.

FIG. 5 is a schematic 500 that illustrates operation of a keyword search module 502 (e.g., the first keyword search module 228, the second keyword search module 232, the Nth keyword search module 236) and an embedding search module 504 (e.g., the first embedding search module 230, the second embedding search module 234, the Nth embedding search module 238). The keyword search module 502 searches a text index 506 using the keywords extracted from the query 402 by the keyword extractor module 224. As depicted in FIG. 5, the text index 506 is a reverse index that indexes computer-readable items by keywords included in or otherwise assigned to the items. The keyword search module 502 identifies items that include at least one of the keywords (or synonyms of the keywords) and computes scores 508 for the identified items.

The embedding search module 504 receives the embedding output by the query embedder module 226 and searches over an embedding index 510 based upon the aforementioned embedding. The embedding index 510 includes semantic embeddings of portions of computer-readable items. For instance, the semantic embeddings may be embeddings of portions of texts extracted from computer-readable items, embeddings of images, and so forth. The embedding search module 504 computes cosine similarity scores between the embedding received from the query embedder module 226 and the embeddings in the embedding index 510. The embedding search module 504 outputs a list 512 of some number of computer-readable items that have portions with the highest cosine similar scores with respect to the query embedding.

A score module 514 (e.g., the first score module 318, the second score module 324, etc.) receives the scores 508 and the list 512 and generates modality scores for the computer-readable items, where a modality score for a computer-readable item is based upon a score for the computer-readable item in the scores 508 and a score for the computer-readable item in the list 512. The score module 514 outputs an identifier of the modality, computer-readable items identified by the search modules 502 and 504, and scores for the computer-readable items.

Figure 6:
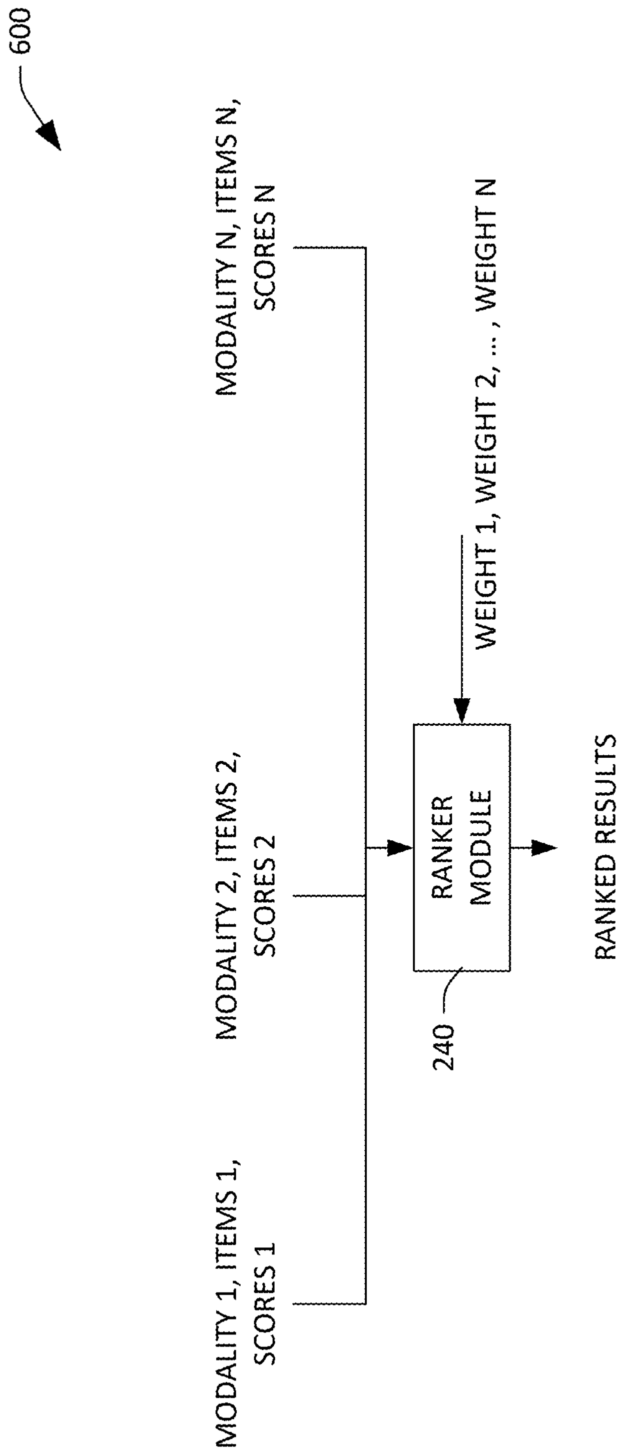
FIG. 6 is a schematic that illustrates ranking of search results based upon scores assigned to the search results with respect to multiple searches over multiple indices of multiple modalities.

FIG. 6 depicts a schematic 600 that illustrates operation of the ranker module 240. The ranker module 240 receives, for each of the N modalities (unless modalities are previously filtered), identities of computer-readable items and scores assigned to the computer-readable items. Optionally, the ranker module 240 receives weights for the different modalities (e.g., as output by the modality detector module 308). Based upon the scores for the different modalities (and the modality weights), the ranker module 240 outputs ranked results. As described above, these results can be further filtered based upon file property filters specified in the query 402 (e.g., author name, type of computer-readable item, etc.).

Figure 7:
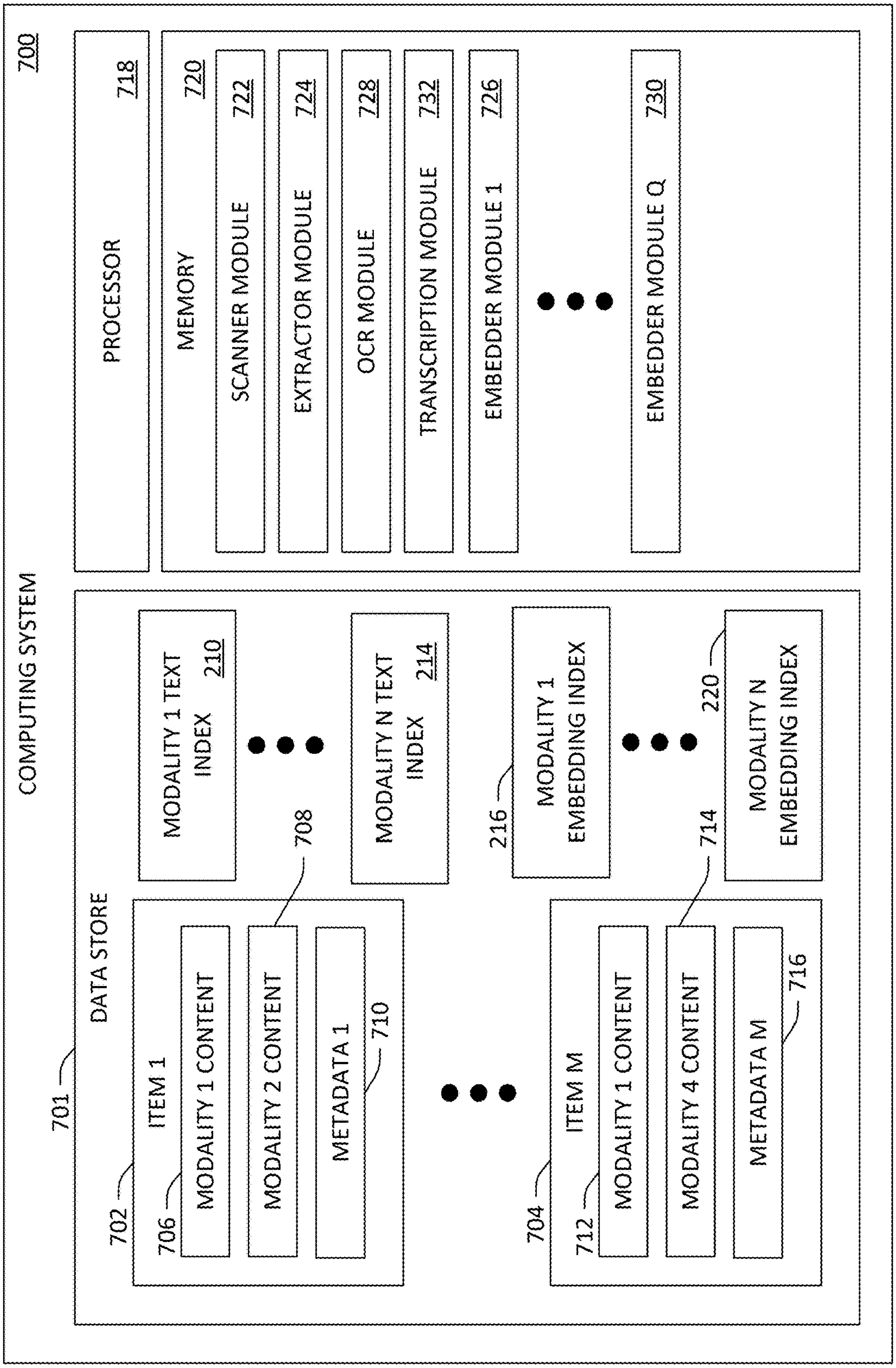
FIG. 7 is a functional block diagram of a computing system that is configured to construct indices for different modalities based upon content of files stored in a file system of a computing system.

Referring to FIG. 7, a functional block diagram of a computing system 700 that is configured to construct and update the text indices 210-214 and the embedding indices 216-220 is depicted. The computing system 700 includes a data store 701 that retains numerous computer-readable items 702-704. The items 702-704 can be or include any suitable type of computer-readable item that can be stored in computer-readable storage, such as word processing documents, spreadsheets, slide presentations, webpages, emails, source code files, portable document format (PDF) files, and the like. The items 702-704 may include different portions of content, where the portions of content can be of the same modality or different modalities. The first item 702 is illustrated as including modality 1 content 706 (e.g., text), modality 2 content 708 (e.g., an image), and first metadata 710 (although it is understood that metadata can be assigned to the first item 702 rather than included in the first item 702). As indicated above, the first computer-readable item 702 may include different content that is of the same modality; for instance, the first computer-readable item 706 can include several images, several videos, etc. The Mth computer-readable item is depicted as including modality 1 content 712 and modality 4 content 714, as well as Mth metadata 716.

The data store 701 also includes the modality 1 text index 210 through the modality N text index 214 and the modality 1 embedding index 216 through the modality N embedding index 220.

The computing system 700 further includes a processor 718 and memory 720 that stores modules that are executed by the processor 718. For example, the memory 720 stores a scanner module 722 that scans the items 702-704 stored in the data store and identifies content of different modalities within the items 702-704. For example, the scanner module 722 scans the items 702-704 when the computing system 700 is otherwise idle. In another example, the scanner module 722 performs an initial scan and then scans each item when the item is saved to the data store 701. In still yet another example, the scanner module 722 scans the items 702-704 according to a schedule (e.g., periodically).

The memory 720 further includes an extractor module 724 that extracts content of a first modality from the items 702-704 based upon the scanner module 722 identifying the content of the first modality in the items 702-704. For instance, when scanning the first item 702, the scanner module 722 identifies the modality 1 content 706 within the first item 702; based upon the scanner module 722 identifying the modality 1 content 706 within the first item, the extractor module 724 extracts the modality 1 content 706 from the first item. For instance, modality 1 is "text", and the extractor module 724 extracts the text from the first item 702. The extractor module 724 can remove stop words from the extracted text, normalize the extracted text, etc., and can update the modality 1 text index 210 based upon the extracted and normalized text. The memory 720 also includes a first embedder module 726 that breaks the extracted, normalized text into "chunks" and creates embeddings of such chunks. Pursuant to an example, the first embedder module 726 includes a tokenizer that tokenizes the text. The first embedder module 726 can have a maximum input length (e.g., P tokens), and can break the text into chunks based upon the maximum input length. For instance, the first embedder module 726 starts at a beginning of the text and identifies the maximum length of tokens in text; the first embedder module 726 then moves backwards in the text until a delimiter is identified, such as a period, an explanation point, a semicolon, etc. The first embedder module 726 breaks the text at the delimiter, and then generates a semantic embedding of the resultant chunk. The first embedder module 726 updates the modality 1 embedding intext 216 to include the semantic embedding of the chunk, where the semantic embedding is mapped to the first item 702 in the modality 1 embedding index 216.

Similarly, with respect to the first metadata 710, the extractor module 724 can extract the first metadata 710 from the first item 702, remove stopwords from the first metadata 710, normalize the extracted text, and update the modality 1 text index 210 to include the normalized text. The first embedder module 726 creates a semantic embedding of the normalized metadata and updates the modality 1 embedding index 216 to include such semantic embedding.

In an example, the second modality is images, and the scanner module 722 can identify the modality 2 content 708 (e.g., an image) in the first item 702. The memory 720 includes an OCR module 728; the OCR module 728 receives the modality 2 content 708 and, through use of OCR technologies, extracts text from the modality 2 content 708. The OCR module 728 optionally removes stopwords from the text, normalizes the text, etc. The OCR module 728 updates the modality 2 text index 212 to include keywords in the text extracted by the OCR module 728, where such keywords are mapped to the first item 702 in the modality 2 text index 212. The first embedder module 726 receives the (normalized) text, chunks the text if necessary, and creates semantic embeddings of the text. The first embedder module 726 updates the modality 2 embedding index 218 to include the semantic embeddings. Moreover, the memory 720 includes a Qth embedder module 730, which receives the modality 2 content 708 and creates an embedding of the modality 2 content 708. Thus, the Qth embedder module 730 creates an embedding of at least a portion of the modality 2 content, where such embedding is in a same latent space as embeddings of queries. The Qth embedder module 730 updates the modality 2 embedding index 218 to include the embedding of the modality 2 content 708, where the first item 702 is mapped to such embedding in the modality 2 embedding index 218.

The scanner module 722 scans the Mth item 704 and ascertains that the Mth item 704 includes the modality 1 content 712, the modality 4 content 714, and the Mth metadata 716. With respect to the modality 1 content 712 and the Mth metadata 716, the extractor module 724 and the first embedder module 726 operate as described above. In an example, the fourth modality is "audio", and therefore the modality 4 content 714 is audio. The memory 720 can include a transcription module 732, where the transcription module 732 receives the modality 4 content 714 and generates a text transcription of the modality 4 content 714. The transcription module 732 can also remove stopwords from the transcription, normalize text in the transcription, etc. The transcription module 732 can additionally update the modality 1 text index 210 based upon the text output by the transcription module 732, where keywords are mapped to the Mth item 704 in a modality 4 text index (not shown). The first embedder module 726 can also partition the (normalized) text output by the transcription module 732 into chunks and can generate semantic embeddings of such chunks. The first embedder module 726 can update a modality 4 embedding index (not shown) to include the semantic embeddings of the chunks, where the semantic embeddings are mapped to the Mth item in the modality 4 embedding index.

Figure 8:
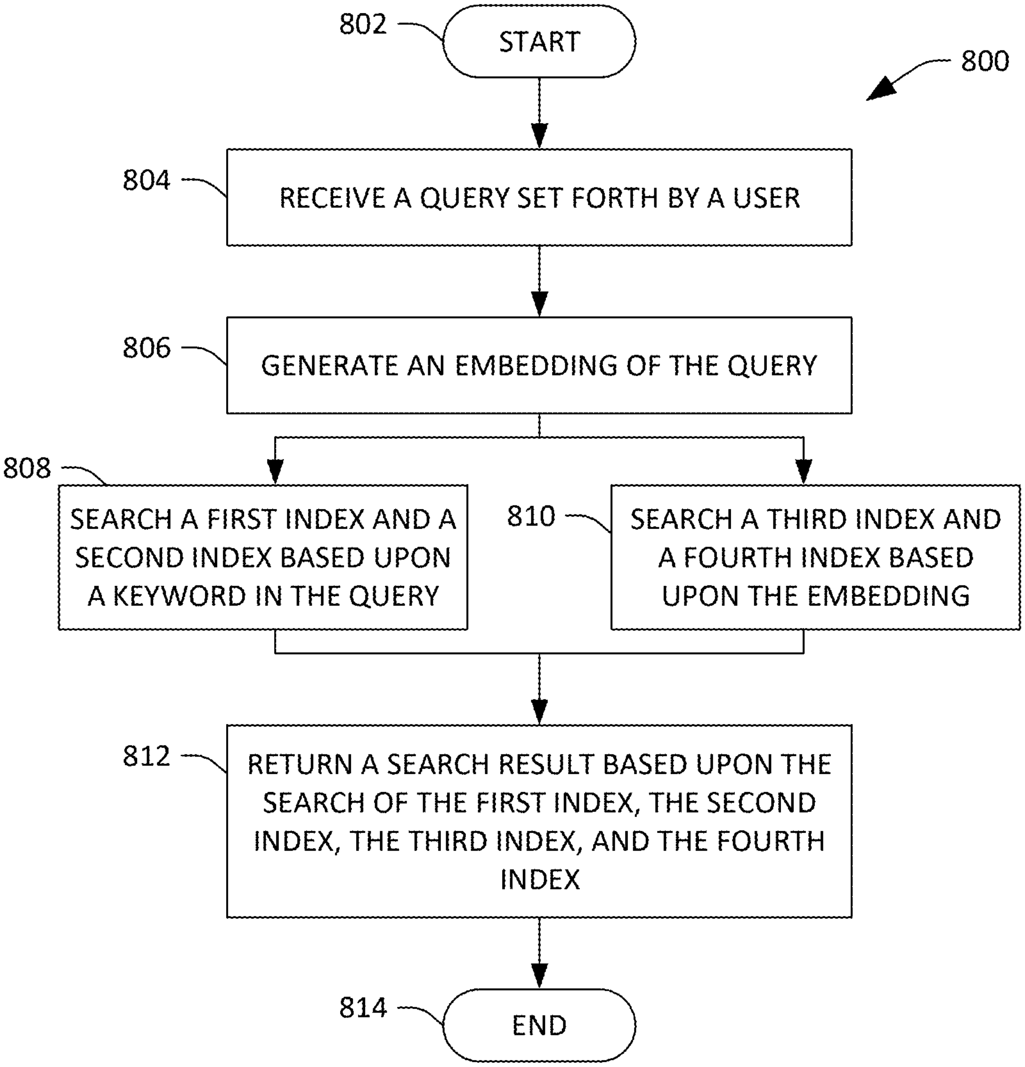
FIG. 8 is a flow diagram that illustrates a method for returning a search result based upon a search over multiple indices in response to receipt of a query.

FIG. 8 illustrates a method 800 relating to file search. While the method is shown and described as being a series of acts that are performed in a sequence, it is to be understood and appreciated that the method is not limited by the order of the sequence. For example, some acts can occur in a different order than what is described herein. In addition, an act can occur concurrently with another act. Further, in some instances, not all acts may be required to implement a method described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

The method 800 starts at 802, and at 804 a query set forth by a user is received. The query can be a relatively complex query, where the query may specify a type of file, a time when the file was received or saved, a modality of content included in the file, etc. At 806, an embedding of the query is generated, where the embedding of the query is a semantic embedding.

At 808, a first index and a second index are searched (in parallel) based upon a keyword in the query. For instance, the modality 1 text index 210 and the modality 2 text index 212 are searched based upon the keyword in the query. At 810, a third index and a fourth index are searched (in parallel) based upon the embedding generated at 806. For example, the modality 1 embedding index 216 and the modality 2 embedding index 218 are searched based upon the embedding generated at 806. Moreover, the third index and the fourth index are searched in parallel with the searching of the first index and the second index.

At 812, a search result is returned based upon the search of the first index, the second index, the third index, and the fourth index. The method 800 completes at 814.

Figure 9:
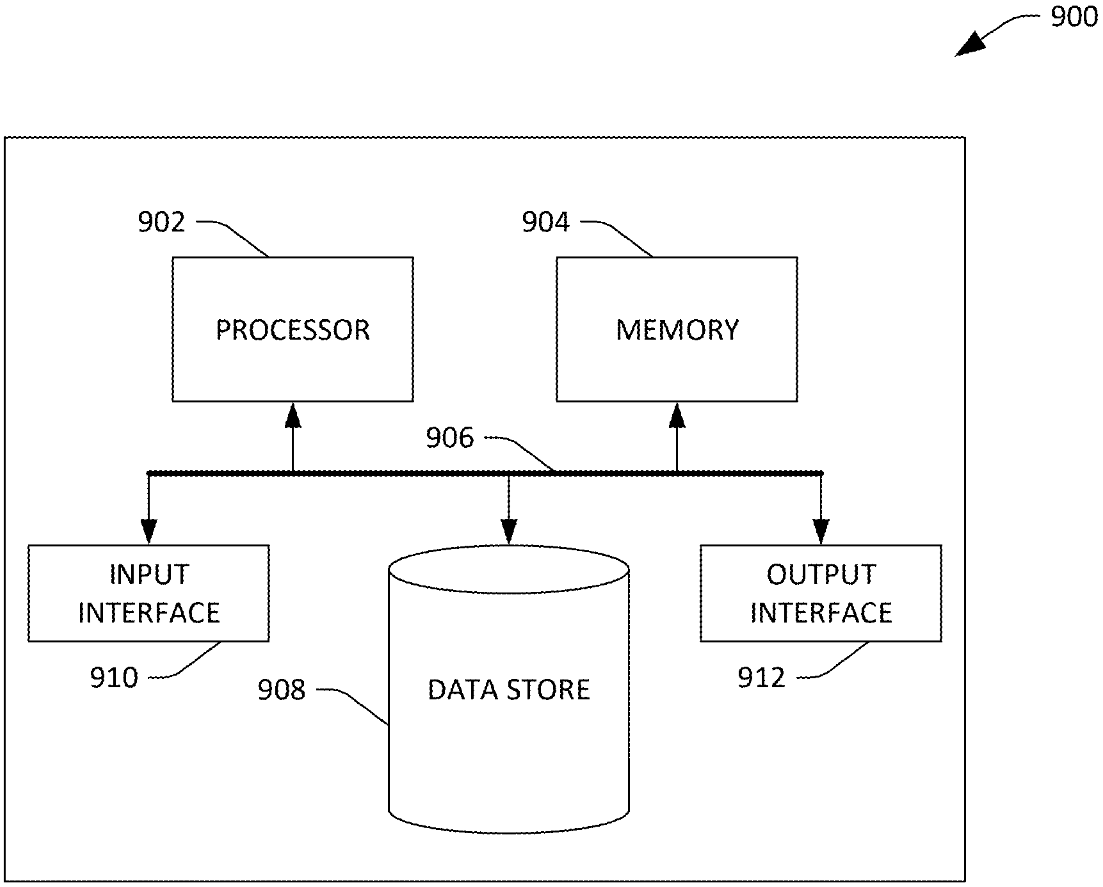
FIG. 9 is a schematic of a computing system.

Referring now to FIG. 9, a high-level illustration of a computing device 900 that can be used in accordance with the systems and methodologies disclosed herein is illustrated. For instance, the computing device 900 may be used in a system that is configured to identify computer-readable items based upon an input query. By way of another example, the computing device 900 can be used in a system that is configured to construct indices that are searched over. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store computer-readable items, indices, embeddings, etc.

The computing device 900 additionally includes a data store 908 that is accessible by the processor 902 by way of the system bus 906. The data store 908 may include executable instructions, computer-readable items, indices, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Various aspects have been described herein in accordance with at least the following examples.

(A1) In an aspect, a method described herein includes receiving a query issued by a user of a computing device, where the query includes a keyword. The method also includes generating an embedding of the query, where the embedding is a semantic representation of the query. The method additionally includes searching a first index for first content of a first modality based upon the keyword in the query, where the first index comprises first keywords that point to a computer-readable item. The method further includes searching a second index based upon the embedding of the query, where the second index comprises a first embedding that is a semantic representation of the first content, and further where the first embedding in the second index points to the computer-readable item. The method also includes searching a third index for second content of a second modality based upon the keyword in the query, where the third index comprises second keywords that point to the computer-readable item. The method additionally includes searching a fourth index based upon the embedding of the query, where the fourth index comprises a second embedding that is a semantic representation of the second content, and further where the second embedding in the fourth index points to the computer-readable item. The method further includes identifying the computer-readable item based upon at least one of the searching of the first index, the searching of the second index, the searching of the third index, or the searching of the fourth index. The method also includes returning the computer-readable item to the user as a search result in response to identifying the computer-readable item.

(A2) In some embodiments of the method of (A1), the method also includes providing the query to a computer-implemented model, where the computer-implemented model outputs a first score for the first modality and a second score for the second modality based upon the query, where the computer-readable item is returned to the user as a search result based upon the first score and the second score.

(A3) In some embodiments of the method of at least one of (A1)-(A2), the method also includes computing a first score for the computer-readable item based upon the searching of the first index. The method additionally includes computing a second score for the computer-readable item based upon the searching of the second index, where the computer-readable item is returned to the user as a search result based upon the first score and the second score.

(A4) In some embodiments of the method of (A3), the method also includes computing a third score for the computer-readable item based upon the first score and the second score, where the compute-readable item is returned to the user as a search result based upon the third score.

(A5) In some embodiments of the method of at least one of (A1)-(A4), the searching of the first index, the searching of the second index, the searching of the third index, and the searching of the fourth index are performed in parallel.

(A6) In some embodiments of the method of at least one of (A1)-(A5), the computing device of the user is a client computing device, and further where the client computing device performs the method of at least one of (A1)-(A5).

(A7) In some embodiments of the method of at least one of (A1)-(A6), the first modality is text and the second modality is images, and further where the computer-readable item includes both text and an image.

(B1) In another aspect, a method includes receiving a query set forth by a user, where the query comprises a keyword. The method also includes generating an embedding of the query, where the embedding of the query is a semantic representation of the query. The method additionally includes searching a first index and a third index based upon the keyword included in the query, where a first index includes first text extracted from computer-readable items, the first text corresponding to a first modality, and the third index includes second text extracted from the computer-readable items, the second text corresponding to a second modality. The method further includes searching a second index and a fourth index based upon the embedding of the query, where the second index includes first embeddings of the first text extracted from the computer-readable items, where the first embeddings are semantic representations of the first text extracted from the computer-readable items, and the fourth index includes second embeddings of the second text, where the second embeddings are semantic representations of the second text. The method also includes returning a search result based upon: 1) the searching of the first index and the third index; and 2) the searching of the second index and the fourth index, where the search result identifies a computer-readable item in the computer-readable items.

(B2) In some embodiments of the method of (B1), the first modality is text and the second modality is images.

(B3) In some embodiments of the method of (B2), an image in the images includes text, and the method also includes extracting the text from the image using object character recognition. The method additionally includes updating the third index to include the text extracted from the image.

(B4) In some embodiments of the method of at least one of (B1)-(B3), the method also includes providing an image in the images to a computer-executable model that generates embeddings of images, where the computer-executable model generates an embedding of the image in response to receiving the image. The method additionally includes updating the fourth index to include the embedding of the image.

(B5) In some embodiments of the method of at least one of (B1)-(B4), the method is performed by a client computing deice operated by the user, where the computer-readable items are stored in a data store that includes the first index, the second index, the third index, and the fourth index.

(B6) In some embodiments of the method of at least one of (B1)-(B4), the method is performed by a server computing system that is in network communication with a client computing device, where the query is received from the client computing device.

(B7) In some embodiments of the method of at least one of (B1)-(B6), the method also includes performing named entity recognition to identify the keyword in the query in response to receiving the query.

(B8) In some embodiments of the method of at least one of (B1)-(B7), the method also includes receiving a second query set forth by the user, where the second query specifies a type of the computer-readable item. The method additionally includes determining that the second query specifies the type of the computer-readable item. The method further includes searching the first index and the second index based upon the second query, where a second search result is identified based upon the searching of the first index and the second index. The method also includes filtering the second search result based upon type of the computer-readable item specified in the second query.

(B9) In some embodiments of the method of at least one of (B1)-(B8), the searching of the first index, the second index, the third index, and the fourth index is performed in parallel.

(B10) In some embodiments of the method of at least one of (B1)-(B9), the method also includes computing a score for the search result, where computing the score for the search result includes: 1) computing a first score for the search result based upon the searching of the first index; and 2) computing a second score for the search result based upon the searching of the third index, where the score is computed based upon the first score and the second score.

(B11) In some embodiments of the method of (B10), the first score is computed based upon a first weight assigned to the first index, and the second score is computed based upon a second weight assigned to the third index.

(B12) In some embodiments of the method of at least one of (B1)-(B11), the method also includes returning a second search result based upon:1) the searching of the first index and the third index; and 2) the searching of the second index and the fourth index, where the second search result identifies a second computer-readable item. The method additionally includes ranking the search result relative to the second search result based upon a first score assigned to the search result and a second score assigned to the second search result.

(C1) In another aspect, a computing system includes a processor and memory, where the memory stored instructions that, when executed by the processor, cause the processor to perform any of the methods disclosed herein (e.g., any of the methods of (A1)-(A8) or (B1)-(B12)).

(D1) In yet another aspect, a computer-readable storage medium includes instructions that, when executed by a processor, cause the processor to perform any of the methods disclosed herein (e.g., any of the methods of (A1)-(A8) or (B1)-(B12)).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:

a data store that comprises:

a first index that comprises first text extracted from computer-readable items, the first text corresponding to a first modality;

a second index that comprises first embeddings of the first text extracted from the computer-readable items, where the first embeddings are semantic representations of the first text extracted from the computer-readable items;

a third index that comprises second text extracted from the computer-readable items, the second text corresponding to a second modality; and a fourth index that comprises second embeddings of the second text, where the second embeddings are semantic representations of the second text; a processor; and memory storing instructions that, when executed by the processor, cause the processor to perform acts comprising:

receiving a query set forth by a user, where the query comprises a keyword;

generating an embedding of the query, where the embedding of the query is a semantic representation of the query;

searching the first index and the third index based upon the keyword included in the query;

searching the second index and the fourth index based upon the embedding of the query; and returning a search result based upon:

the searching of the first index and the third index; and the searching of the second index and the fourth index, where the search result identifies a computer-readable item in the computer-readable items.

2. The computing system of claim 1, where the first modality is text and the second modality is images.

3. The computing system of claim 2, where an image in the images comprises text, the acts further comprising:

extracting the text from the image using object character recognition; and updating the third index to include the text extracted from the image.

4. The computing system of claim 2, the acts further comprising:

providing an image in the images to a computer-executable model that generates embeddings of images, where the computer-executable model generates an embedding of the image in response to receiving the image; and updating the fourth index to include the embedding of the image.

5. The computing system of claim 1 being a client computing device operated by the user, where the computer-readable items are stored in the data store.

6. The computing system of claim 1 being a server computing system that is in communication with a client computing device, where the query is received from the client computing device.

7. The computing system of claim 1, the acts further comprising:

in response to receiving the query, performing named entity recognition to identify the keyword in the query.

8. The computing system of claim 1, the acts further comprising:

receiving a second query set forth by the user, where the second query specifies a type of the computer-readable item;

determining that the second query specifies the type of the computer-readable item; and searching the first index and the second index based upon the second query, where a second search result is identified based upon the searching of the first index and the second index; and filtering the second search result based upon type of the computer-readable item specified in the second query.

9. The computing system of claim 1, wherein the searching of the first index, the second index, the third index, and the fourth index is performed in parallel.

10. The computing system of claim 1, the acts further comprising:

computing a score for the search result, where computing the score for the search result comprises:

computing a first score for the search result based upon the searching of the first index; and computing a second score for the search result based upon the searching of the third index, where the score is computed based upon the first score and the second score.

11. The computing system of claim 10, where the first score is computed based upon a first weight assigned to the first index, and the second score is computed based upon a second weight assigned to the third index.

12. The computing system of claim 1, the acts further comprising:

returning a second search result based upon:

the searching of the first index and the third index; and the searching of the second index and the fourth index, where the second search result identifies a second computer-readable item; and ranking the search result relative to the second search result based upon a first score assigned to the search result and a second score assigned to the second search result.

13. A method comprising:

receiving a query issued by a user of a computing device, where the query includes a keyword;

generating an embedding of the query, where the embedding is a semantic representation of the query;

searching a first index for first content of a first modality based upon the keyword in the query, where the first index comprises first keywords that point to a computer-readable item;

searching a second index based upon the embedding of the query, where the second index comprises a first embedding that is a semantic representation of the first content, and further where the first embedding in the second index points to the computer-readable item;

searching a third index for second content of a second modality based upon the keyword in the query, where the third index comprises second keywords that point to the computer-readable item;

searching a fourth index based upon the embedding of the query, where the fourth index comprises a second embedding that is a semantic representation of the second content, and further where the second embedding in the fourth index points to the computer-readable item;

identifying the computer-readable item based upon at least one of the searching of the first index, the searching of the second index, the searching of the third index, or the searching of the fourth index; and returning the computer-readable item to the user as a search result in response to identifying the computer-readable item.

14. The method of claim 13, further comprising:

providing the query to a computer-implemented model, where the computer-implemented model outputs a first score for the first modality and a second score for the second modality based upon the query, where the computer-readable item is returned to the user as a search result based upon the first score and the second score.

15. The method of claim 13, further comprising:

computing a first score for the computer-readable item based upon the searching of the first index; and computing a second score for the computer-readable item based upon the searching of the second index, where the computer-readable item is returned to the user as a search result based upon the first score and the second score.

16. The method of claim 15, further comprising computing a third score for the computer-readable item based upon the first score and the second score, where the compute-readable item is returned to the user as a search result based upon the third score.

17. The method of claim 13, where the searching of the first index, the searching of the second index, the searching of the third index, and the searching of the fourth index are performed in parallel.

18. The method of claim 13, where the computing device of the user is a client computing device, and further where the client computing device performs the method of claim 13.

19. The method of claim 13, where the first modality is text and the second modality is images, and further where the computer-readable item includes both text and an image.

20. A computer-readable storage medium comprising instructions that, when executed by a processor, cause the processor to perform acts comprising:

receiving a query issued by a user of a computing device, where the query includes a keyword;

generating an embedding of the query, where the embedding is a semantic representation of the query;

searching a first index for first content of a first modality based upon the keyword in the query, where the first index comprises first keywords that point to a computer-readable item;

searching a second index based upon the embedding of the query, where the second index comprises a first embedding that is a semantic representation of the first content, and further where the first embedding in the second index points to the computer-readable item;

searching a third index for second content of a second modality based upon the keyword in the query, where the third index comprises second keywords that point to the computer-readable item;

searching a fourth index based upon the embedding of the query, where the fourth index comprises a second embedding that is a semantic representation of the second content, and further where the second embedding in the fourth index points to the computer-readable item;

identifying the computer-readable item based upon at least one of the searching of the first index, the searching of the second index, the searching of the third index, or the searching of the fourth index; and returning the computer-readable item to the user as a search result in response to identifying the computer-readable item.

* * * * *